United States Patent [19]

Rutchik et al.

[11] Patent Number: 4,597,025
[45] Date of Patent: Jun. 24, 1986

[54] MINIMUM SIZE, INTEGRAL, A.C. OVERLOAD CURRENT SENSING, REMOTE POWER CONTROLLER

[75] Inventors: Walter L. Rutchik, Wauwatosa; Werner B. Halbeck, Mequon; James H. Bigelow, Milwaukee, all of Wis.

[73] Assignee: Eaton Corporation, Cleveland, Ohio

[21] Appl. No.: 214,616

[22] Filed: Dec. 9, 1980

Related U.S. Application Data

[63] Continuation of Ser. No. 923,325, Jul. 10, 1980, abandoned.

[51] Int. Cl.$^4$ ............................................. H02H 3/00
[52] U.S. Cl. ........................................ 361/94; 361/31; 361/71; 336/175; 336/229
[58] Field of Search .................. 361/93, 94, 95, 96, 361/97, 31, 115, 24, 71, 114, 37; 307/293; 336/175, 176, 229

[56] References Cited

U.S. PATENT DOCUMENTS

| | | | |
|---|---|---|---|
| 2,241,127 | 5/1941 | Harder | 361/63 |
| 2,920,297 | 1/1960 | Spicer | 336/175 X |
| 3,227,925 | 1/1966 | Cook . | |
| 3,398,325 | 8/1968 | Schaffer . | |
| 3,444,434 | 5/1969 | Zocholl . | |
| 3,633,073 | 1/1972 | Day, III . | |
| 3,673,455 | 6/1972 | Dewey | 361/63 |
| 3,693,120 | 9/1972 | Quaal et al. | 335/128 |
| 3,700,970 | 10/1972 | Miyoshi . | |
| 3,761,777 | 9/1973 | Willard et al. | 361/96 |
| 3,846,675 | 11/1974 | Shimp | 361/95 |
| 3,855,503 | 12/1974 | Ristuccia | 361/37 |
| 3,914,667 | 10/1975 | Waldron . | |
| 3,968,410 | 7/1976 | Graham . | |
| 4,006,387 | 2/1977 | Hudak | 361/94 X |
| 4,027,203 | 5/1977 | Moran et al. | 361/96 X |
| 4,038,618 | 7/1977 | Gryctko | 361/115 X |
| 4,060,844 | 11/1977 | Davis | 361/96 |

OTHER PUBLICATIONS

"An Instrument for the Measurement of Large Alternating Currents", by Wather Richter, Transactions of the American Institute of Electrical Engineers, 2/11/44, vol. 63, 1944, pp. 1–3 and cover page.

Primary Examiner—A. D. Pellinen
Assistant Examiner—Jeffrey A. Gaffin
Attorney, Agent, or Firm—C. H. Grace; W. A. Autio

[57] ABSTRACT

An A.C. overload current sensing, remote power controller of minimum size and weight and integral construction. Current rate sensing wound toroids are used that are small enough to fit around the line terminal studs without having to enlarge the prior insulator space available therein. The electronic overload current detecting and tripping control circuit is replaced by a pair of modules, detector and control modules, having improved performance and a shape and size such that they fit within the relay housing alongside its operating magnet. The detector module has integrator means for converting current rate of change signals into current magnitude indicative signals thereby enabling use therewith of rate sensing wound toroids of about one-tenth the size of equivalent current transformer wound toroids. It fully meets the calibrated step function overload trip time requirements while also providing protection for unusual overload conditions such as varying overloads including pulse accumulation effects or repetitive reset, and simulates the response of a thermal element to prevent excess heating of the wire or load that it is protecting under any overload conditions. Moreover, one version of the control module incorporates a single standard CMOS IC logic element that provides a digital solution to the combinations of control conditions requirements while at the same time reducing the number of conventionally-required cutthroat contacts from two to one and isolating the control input from the relay power circuit. Another version provides reset lockout.

13 Claims, 12 Drawing Figures

MINIMUM SIZE, INTEGRAL, A.C. OVERLOAD CURRENT SENSING, REMOTE POWER CONTROLLER

This application is a continuation of application Ser. No. 923,325, filed July 10, 1980; and now abandoned.

CROSS-REFERENCES TO RELATED APPLICATIONS

James R. Jaeschke and Walter L. Rutchik copending application, Ser. No. 071,725, filed Aug. 31, 1979, relates to the thermal simulation means of the present application. John E. Hayden and Walter L. Rutchik copending application, Ser. No. 071,726, filed Aug. 31, 1979, relates to the means for inhibiting attempted setting of the overload relay while the overload trip signal is on of the present application. And James E. Hansen and Walter L. Rutchik copending application, Ser. No. 083,159, filed Oct. 9, 1979, relates to a reset lockout modification of the present application.

BACKGROUND OF THE INVENTION

Overload current sensing electric controllers have been known heretofore. However, prior devices of this type have been of rather large size and weight. This is for the reason that the contactor or relay was enclosed in one housing and the tripping control circuit was enclosed in another housing which were separately attached to a mounting panel. The overload current transformer wound toroids were placed around the three-phase load conductors and connected to the tripping control circuit and the latter was connected to the relay by electrical conductors. This not only involved large size and weight but also required a rather large amount of panel mounting space.

While these prior devices have been useful for their intended purposes, this invention relates to improvements thereover.

SUMMARY OF THE INVENTION

An object of the invention is to provide an improved remote power controller for remote control and protection of an electrical load.

A more specific object of the invention is to provide a remote power controller of the aforementioned type of minimum physical size.

Another specific object of the invention is to provide a remote power controller of the aforementioned type having integral construction.

Another specific object of the invention is to provide an improved remote power controller having predetermined overload current trip time characteristics affording optimum circuit protection.

Another object of the invention is to provide an improved overload current trip function by incorporating electronic modules into a standard relay configuration thereby to provide an integral device having improved features of performance but of the same physical size and weight.

Another object of the invention is to provide an overload current trip function with the combination of current rate of change sensing means and active integrating means in order to develop an overload current tripping signal with apparatus of significantly smaller size.

Another object of the invention is to provide an overload current sensor with an integral electronic signal processor such as to allow use of current rate of change sensing wound toroids of small size thereby allowing mounting thereof on the relay terminals in order to provide an integral remote controller of minimum size and weight.

Another object of the invention is to provide a power controller with an overload current trip time response that fully meets the calibrated step function overload trip time requirements while also providing protection for unusual overload conditions such as varying overloads including pulse accumulation effects or repetitive reset.

Another object of the invention is to provide a power controller with an overload current trip time response that simulates the response of a thermal element to prevent excess heating of the wire or load it is protecting under any overload conditions.

Another object of the invention is to provide an itegral electronic signal processor of the aforementioned type incorporating means providing a digital solution to the control requirements by using a standard CMOS IC logic element that eliminates the need for one of the usual cutthroat contacts and isolates the control input from the relay coil power circuit.

Another object of the invention is to provide a remote power controller incorporating an additional control input for reset lockout.

Other objects and advantages of the invention will hereinafter appear.

DESCRIPTION OF THE PREFERRED EMBODIMENT

Figure 1:
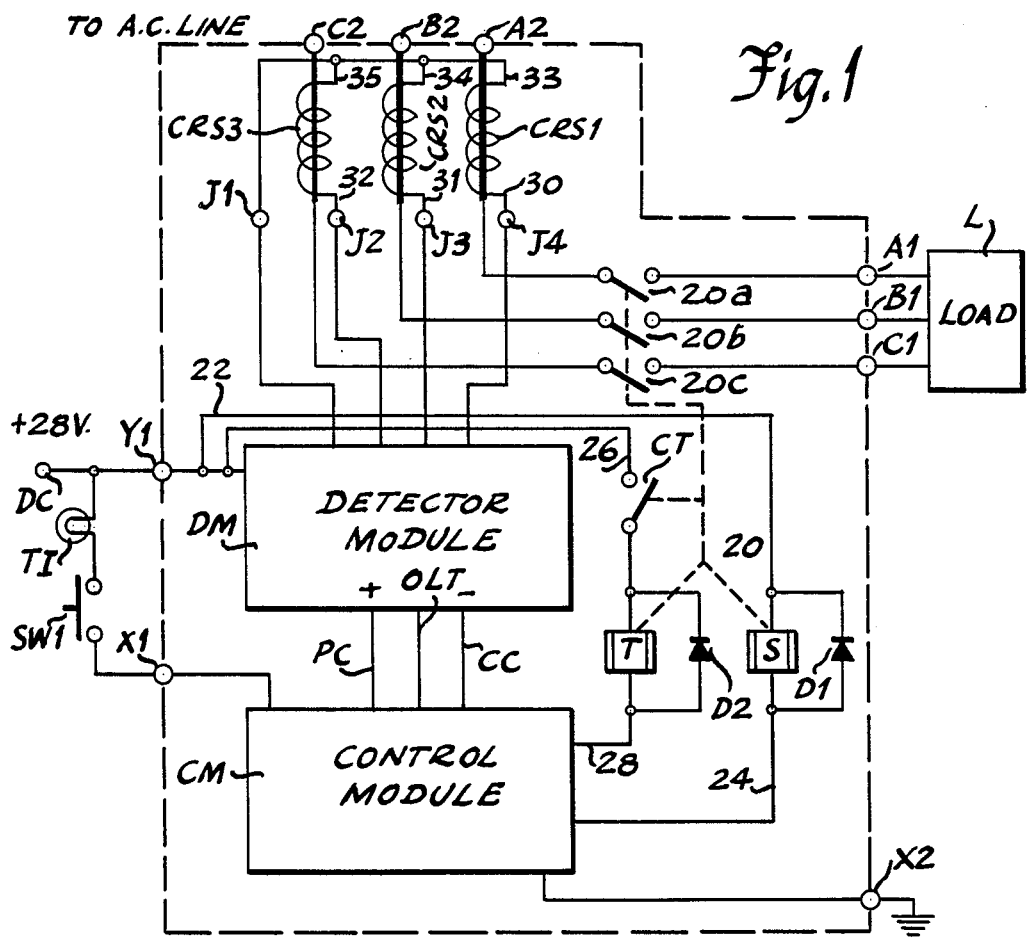
FIG. 1 is a partly block and partly schematic diagram showing the relationship of the remote power controller to a three-phase A.C. power line supplying a load.

Referring to FIG. 1, there is shown an overload current sensing, remote power controller connectable to a three-phase power line for supplying a load. The load may be any typical A.C. type load such as a three-phase A.C. motor or resistive or inductive load or the like. Power controllers of this type are also generally known as starters, electric or motor controllers, overcurrent protective relays, or contactors, overload current protective relays or contactors, or the like.

As shown generally in FIG. 1, the remote power controller is provided with three load terminals A1, B1 and C1 that are normally connected to a three-phase load L and three line terminals A2, B2 and C2 that are connectable to a three-phase power line. Line terminals A2, B2 and C3 are connected through normally-open contacts 20a, 20b and 20c of an overload relay 20 to load terminals A1, B1 and C1, respectively. When these contacts are open as shown, power is disconnected from the load and when these contacts are closed, power is connected to energize the load.

Relay 20 is of the bistable type and is provided with a set coil S, a trip coil T, and a cutthroat contact CT in addition to its three power control contacts 20a-c as indicated by the broken lines in FIG. 1 connecting these elements. Contact CT is normally-open and in series with the trip coil. When the set coil is momentarily energized, the relay motor, shown in FIGS. 6 and 7, causes all four contacts to close and are magnetically latched in known manner. The three power contacts connect power from the line to the load and cutthroat contact CT prepares the trip coil circuit for opening the relay contacts as hereinafter described. When the trip coil is energized, the relay motor transfers to the opposite state, causing all four contacts to reopen and are magnetically latched open also. Diodes D1 and D2 across the respective set and trip coils are poled to conduct current in response to the induced voltage when these coil circuits are opened.

The electronic circuit of the remote power controller is included on two modules shown in FIG. 1 as a detector module DM and a control module CM. Direct current operating power is supplied to the remote power controller from a source DC to terminal Y1. From terminal Y1, this power is connected to detector module DM, and also through conductor 22 to set coil S, the other side of which is connected through conductor 24 to control module CM, and also through conductor 26 to cutthroat contact CT, the other side of which is connected through trip coil T and conductor 28 to control module CM. This operating power is also connected as a control signal, when control switch SW1, which is a maintained type, is closed, through trip indicator TI and terminal X1 to control module CM, whereby the remote power controller closes (sets). When control switch SW1 is opened, the remote power controller opens (trips). The direct current operating power is connected from detector module DM through positive voltage conductor PC and grounded or common conductor CC to control module CM and the latter is connected to ground at terminal X2.

The remote power controller disclosed herein has four conditions or states that are defined as follows. The term "closes" (sets) means that the relay power contacts close to connect power from the A.C. source to the load. The term "opens" (trips) means that the relay power contacts open to disconnect the A.C. power from the load. The term "reset" means a condition or state of the circuit from which it can be turned directly "on", that is, closing or setting the relay by merely closing the control switch. The term "lockout" means a condition or state from which the relay cannot be closed or set by manipulation of the control switch.

Current rate sensing wound toroids CRS1, CRS2 and CRS3 surround terminals A2, B2 and C3, respectively, to sense the changing value of A.C. current therein. The coils of these toroids are connected at first sides thereof through conductors 30, 31 and 32 to terminals J4, J3 and J2, respectively, and at their other sides through conductors 33, 34 and 35 to common terminal J1 as shown in FIG. 1. Terminals J2, J3, J4 and J1 are connected internally of the remote power controller to detector module DM as hereinafter described in connection with FIG. 8. And detector module DM is connected through a conductor OLT to control module CM to pass the overload trip signal as hereinafter described in more detail.

Figure 2:
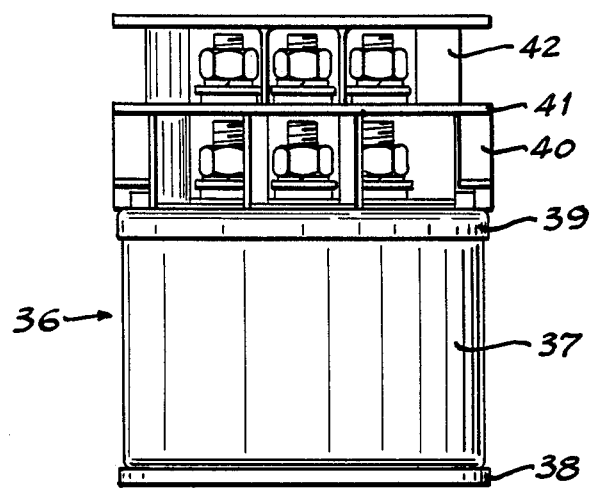
FIG. 2 is a front elevational view of the integral, overload current sensing, remote power controller of FIG. 1 showing it in its actual size.
Figure 3:
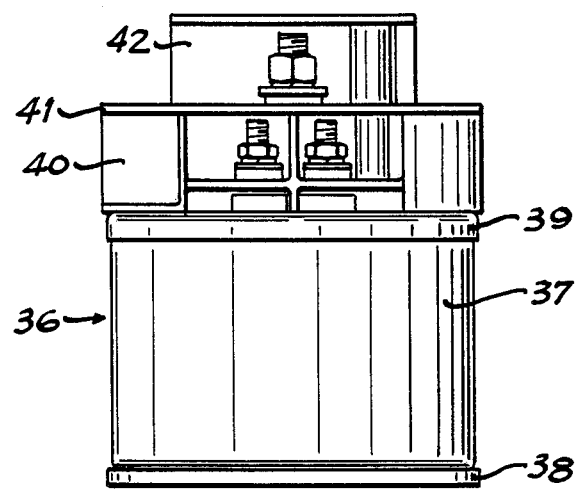
FIG. 3 is a right size elevational view of the power controller of FIG. 2.

As schematically shown in FIG. 1, the remote power controller is an integral device enclosed by the broken line which represents the single enclosure 36 shown in FIGS. 2 and 3 that houses both the relay and the electronic circuit that controls it. The terminals connected by this broken line are external terminals of the remote power controller unit to which connections are made from the A.C. and D.C. power supplies, the load, the remote control switch and ground. This integral construction provides a unit of minimum size and weight as will hereinafter appear.

MINIMUM SIZE INTEGRAL POWER CONTROLLER

Referring to FIGS. 2 and 3, there are shown front elevational and right side elevational views of an integrally-built overload current sensing remote power controller according to the invention. The controller comprises the parts shown in FIG. 1 including generally a power control relay having a set coil for closing the relay contacts, latching means for latching the contacts open or closed, a trip coil for opening the relay contacts, wound toroids for sensing an overload current to a load, and an electronic detector and control system that not only controls the relay in response to an external signal but also responds to an overload signal from the sensing wound toroids to control tripping of the relay. Such tripping opens the relay contacts to disconnect power from the load and thus protect the power circuit from overload currents.

As shown in FIGS. 2 and 3 in actual size, this power controller generally comprises a relay housing 36 that includes a cylindrical shell 37 closed at the bottom by a plate 38 and at the top by a header 39 through which extend a plurality of line, load and control terminal studs hereinafter more specifically described in connection with the enlarged views in FIGS. 4–7. These terminal studs are separated by an insulating terminal barrier 40 that is secured in place by lock nuts on the group of shorter, load and control terminal studs. An insulating plate 41 covers terminal barrier 40 and has holes therein through which the longer, line terminals extend. An insulating terminal cover 42 separates and covers these longer terminals and this cover and the insulating plate are secured by a pair of screws extending therethrough and being threaded into terminal barrier 40.

PHYSICAL STRUCTURE

Figure 4:
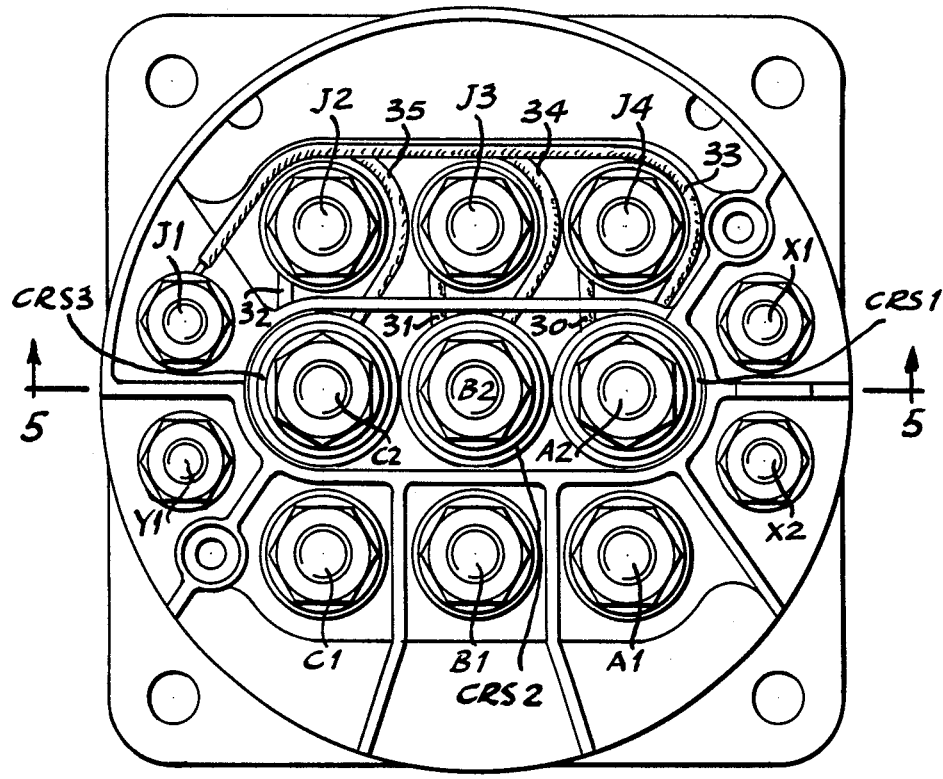
FIG. 4 is an enlarged top view of the remote power controller of FIGS. 2 and 3 showing the A.C. power line terminals, the load terminals, the D.C. power terminals, and the current rate sensing wound toroid and wound toroid connection terminals.
Figure 5:
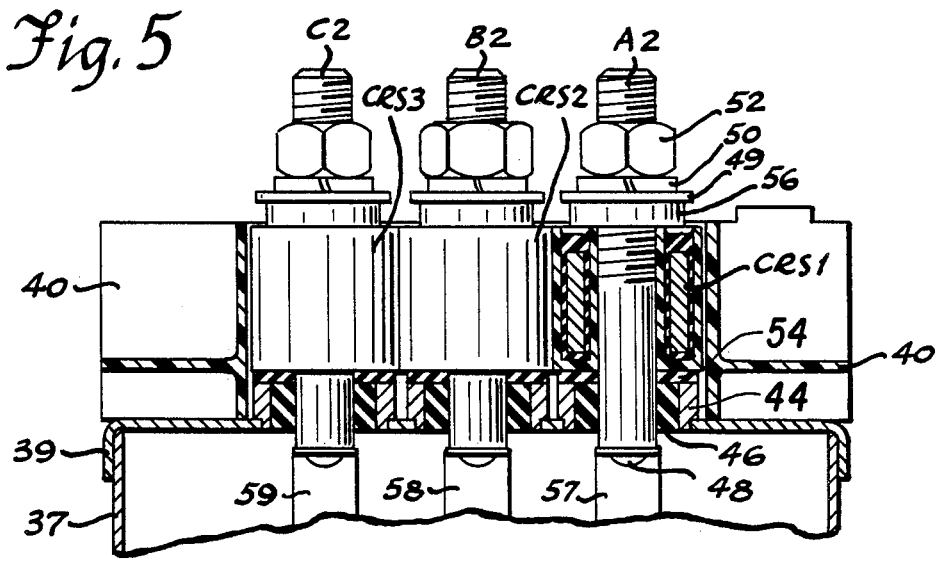
FIG. 5 is a fragmentary cross-sectional view taken substantially along line 5—5 of FIG. 4 to show the current rate sensing wound toroids around the respective A.C. power line terminals.
Figure 6:
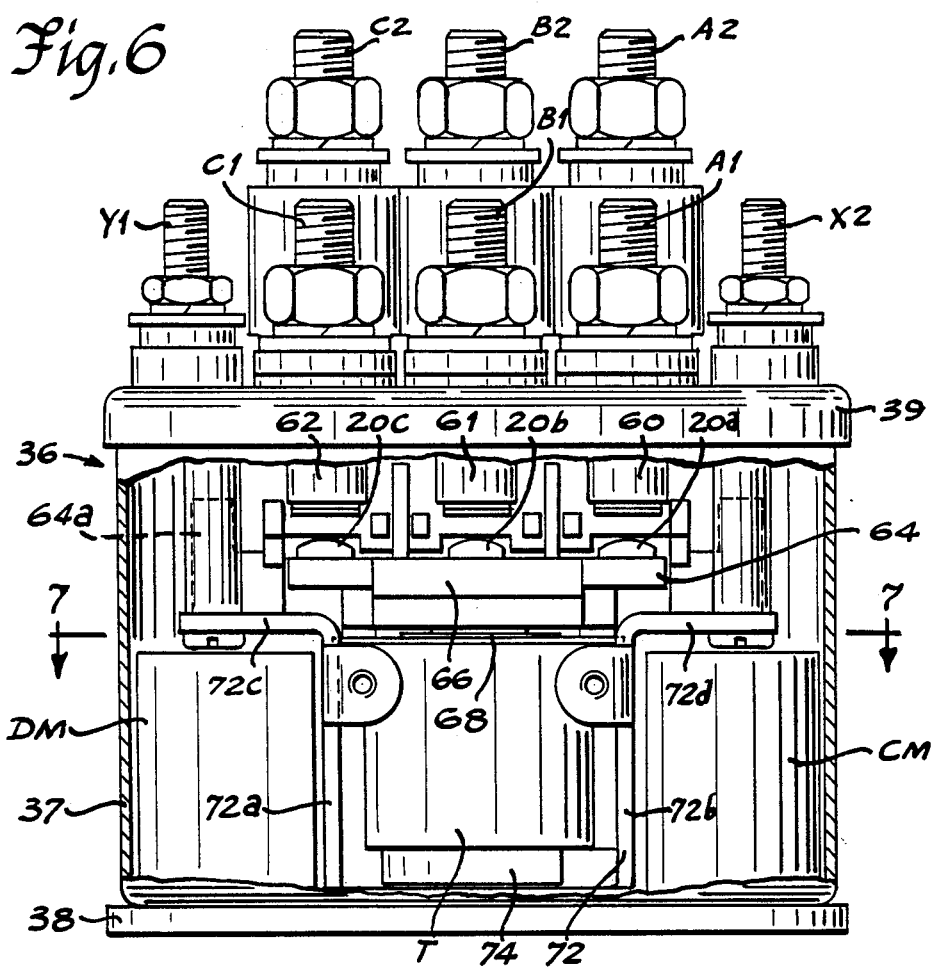
FIG. 6 is an elevational view partly in section of the remote power controller of FIGS. 4 and 5 showing internal parts thereof including the two electronics modules.
Figure 7:
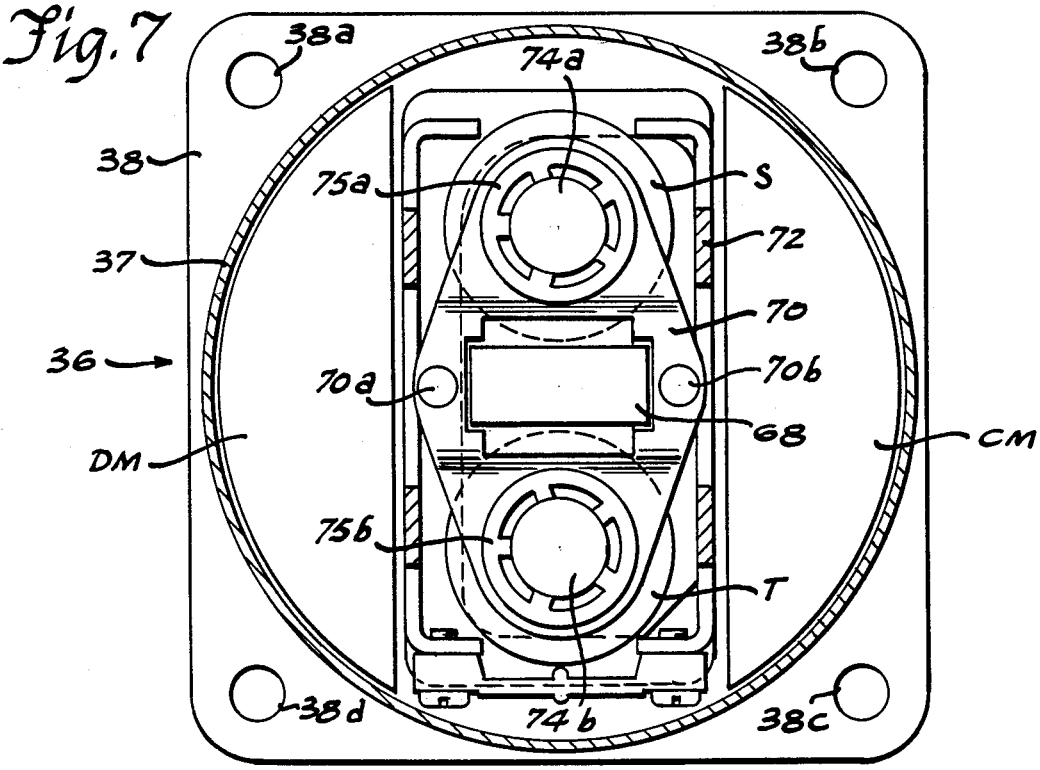
FIG. 7 is a cross-sectional view taken substantially along line 7—7 of FIG. 6 to show a top view of the two electronics modules.

FIGS. 4–7 show in enlarged views the physical configuration of the integral, power controller unit enclosed in a housing not larger than the housing of a prior electromagnetic relay per se as shown in FIGS. 2 and 3. As shown in FIGS. 4–7, this controller is provided with the sealed housing 36 comprising a cylindrical metal shell 37 closed at its bottom end by a generally square flat metal mounting plate 38 and closed at its top end by a metal header 39 that supports the terminals. As shown in FIGS. 4 and 7, the corners of the square mounting plate extend out from round shell 37 and are provided with holes 38a–d whereby the unit may be secured to a mounting panel by bolts, screws, or the like. The mounting plate and header are soldered or brazed to opposite ends of the cylindrical shell to form a hermetically sealed enclosure.

As shown in FIGS. 4–6, the power controller unit is provided with a plurality of external terminals for connecting the internal electronic modules, relay coils and contacts to external circuits. These external terminals are shown schematically in FIG. 1 and in more detail in FIGS. 4–6. These external terminals include load terminals A1, B1 and C1 shown in FIGS. 4 and 6, line terminals A2, B2 and C2 shown in FIGS. 4, 5 and 6, individual sense wound toroid connecting terminals J2, J3 and J4 and common sense wound toroid connecting terminal J1 shown in FIG. 4, ground terminal X2 and operating power terminal Y1 shown in FIGS. 4 and 6, and control terminal X1 shown in FIG. 4. All of these terminals are in the form of partly threaded studs that extend from the interior of the housing out through header 39. For this purpose, the header is provided with suitable holes into which are secured supporting bushings 44, FIG. 5, either on the inner or outer side of the header and the terminal studs extend through these bushings and are supported and electrically insulated therefrom by vitreous material 46 as shown with respect to terminal A2 in FIG. 5. These bushings are sealingly secured as by brazing to the header and the vitreous material 46 not only electrically insulates the terminals from the metal header but also seals them to the bushings so that the interior of the housing is hermetically sealed from the outside. These terminal studs are provided with suitable riveted connectors 48 or the like at their unthreaded internal ends for connection to the circuits within the housing as generally shown in FIG. 5 and are provided with flat and lock washers 49 and 50 and nuts 52 at their threaded external ends for connection to external circuits as shown in FIGS. 1 and 5.

As shown in FIGS. 5 and 6, line terminal studs A2, B2 and C2 are longer than the other terminal studs which are of substantially equal length in order to provide physical and electrical clearance for the power line conductors that extend thereto from the power supply source. Thus, the line conductors can overlie the shorter sense wound toroid terminal studs J4, J3 and J2 (or load terminal studs A1, B1 and C1) with sufficient clearance and will be secured to line terminal studs A2, B2 and C2. The load conductors will be secured to load terminal studs A1, B1 and C1 and will extend downwardly in the FIG. 4 orientation therefrom to the load.

In order to minimize the size and weight of the power controller unit, the three current rate sensing wound toroids CRS1, CRS2 and CRS3 have been constructed and arranged to occupy the space around terminal studs A2, B2 and C2 that was previously occupied by spacers in the form of insulating bushings. That is, in the prior art, in order to space the connector elements such as the washers and nuts up near the tips of the threaded sections of the terminal studs, spacer bushings were placed around these line terminal studs. Such spacing was necessary in order to provide clearance between the line conductors connected to the line terminal studs and the upper ends of the three shorter terminal studs over which they pass. In such prior art devices, current transformer secondary coils were used for overload current sensing purposes and these secondary coils which required many more turns of wire were normally placed around the three flexible conductors leading away from the load terminals to pick up the value of A.C. current being supplied to the load. Also in such prior art devices, the pairs of conductors from the current transformer secondary coils were connected to an electronic trip control circuit that was separately housed and mounted on the mounting panel near the relay. And the set and trip relay coils and two cutthroat contacts in series therewith, respectively, were connected to such separate electronic trip control module.

Because such current transformer secondary coils required a large number of turns such as of the order of 500 turns, for example, and a large iron core to keep them from saturating in normal use, they would not, of course, fit into the small spaces available around the line terminals, nor around the load terminals where the space is even less since these terminal studs are shorter. However, the invention provides different types of devices, that is, current rate sensing wound toroids that can be made smaller having a fewer number of turns such as of the order of 90 turns, for example, and an overall relative size ratio with respect to equivalent current transformer secondary coils of 1 to 10 that will fit into the spaces available around the line terminal studs. Rather than sensing the amplitude of the A.C. current flowing to the load as is the case with a current transformer, these wound toroids sense the rate of change of the load current. The invention provides such current rate sensing wound toroids in combination with an electronic system that will receive the rate signal therefrom and convert it into a signal indicative of and proportional to the temperature of the wires or load through which the current is flowing and which will trip the relay to open the power circuit to the load when such signal reaches a predetermined overload value requiring protection from overheating.

These current rate sensing wound toroids are shown in FIGS. 4 and 5 as wound toroids CRS1, CRS2 and CRS3. As also shown in FIG. 5, a rubber seal 54 in the shape of a washer is first placed around each line terminal stud on top of bushing 44. The wound toroid CRS1 is then placed on the terminal stud on top of the rubber seal. A lock nut 56 is then turned onto the threaded line terminal stud to retain the wound toroid CRS1 thereon. Thereafter, the power line connector elements including flat washer 49, the power line conductor, lock washer 50 and nut 52 are assembled thereon to make the electrical connection.

The relay, which is partly shown in FIGS. 5, 6 and 7, is of the three-pole single-throw bistable type in that it has three movable contacts 20a, 20b and 20c, shown in FIGS. 1 and 6, electrically connected to line terminal studs A2, B2 and C2 by flexible connector strips 57, 58 and 59, FIG. 5. Three stationary contacts 60, 61 and 62, FIG. 6, secured to the internal ends of load terminal studs A1, B1 and C1 are engaged by the respective movable contacts 20a, 20b and 20c when set coil S shown in FIG. 7 is energized to close the circuit from the three-phase A.C. source to the load. These movable contacts are carried by an insulating contact carrier 64 shown in FIG. 6 which is actuated by a center-pivoted armature 66. This power contact and magnet structure is similar to that shown and described in J. A. Quaal et al U.S. Pat. No. 3,693,120, dated Sept. 19, 1972, and owned by the assignee of this invention. At the same time as the line contacts close, a cutthroat contact CT shown schematically in FIG. 1 also closes. This cutthroat contact is similar to the normally-open auxiliary contact 44–50 in A. H. Becker et al U.S. Pat. No. 3,680,016, dated July 25, 1972, and owned by the assignee of this invention, in that its movable contact is mounted on a side projection 64a, FIG. 6, of the armature-actuated contact carrier and its stationary contact is attached to the internal end of terminal stud Y1 as schematically shown in FIG. 1. In this manner, this cutthroat contact closes when the set coil pivots the armature.

Once the armature is pivoted to its "on" position closing the contacts, or to its "off" position opening the contacts, it is magnetically latched. For this purpose, permanent magnet 68 extends through an aperture in armature support 70 and the center of the armature rests thereon and is retained by a pair of lugs 70a and 70b secured to this retainer and extending with limited clearance into slots in the sides of the armature to retain the latter against lateral dislodgement while permitting rocking movement. The two halves of the armature are formed slightly upwardly so that its low center line aligned with its retaining slots rests on and rocks on the permanent magnet. This permanent magnet is polarized so that when the armature is attracted by either coil, the permanent magnet will magnetically retain or latch the contacts open or closed until such time as the opposite coil is energized to counter-act the magnetic latch retaining force and pivot the armature in the other direction.

The housing of this remote power controller also includes supporting structure secured to plate 38 such as a mounting bracket 72 shown in FIGS. 6 and 7 that supports the magnet frame 74 including its cores 74a and 74b that extend up through the set and trip coils S and T, respectively, and through holes in support 70 that is mounted by a pair of retainers 75a and 75b gripping the cores. This mounting bracket 72 is generally U-shaped as shown in FIG. 6 having a pair of upstanding arms 72a and 72b terminating in lateral wings 72c and 72d that support other elements within the housing.

The detector module DM and control module CM shown as rectangles in FIG. 1 are actually in the shape of partial-cylindrical encapsulated units, that is, portions of semicylindrical units, as shown in FIGS. 6 and 7. These modules are located in the housing alongside the relay magnet, that is, between upstanding bracket arms 72a and 72b and the opposite sides of cylindrical shell 37 of the housing resting down on mounting plates 38. The electronic elements of these modules are mounted on printed circuit (PC) boards and are connected to the printed circuits thereon and are encapsulated or potted in insulating plastic material in the form shown in FIGS. 6 and 7 so that they fit conveniently in the two spaces alongside frame 72 within the housing. Electrical conductors extend out from these modules and are connected to other elements within the housing to provide the system hereinafter described in connection with FIG. 8.

ELECTRONIC CIRCUIT

Figure 8:
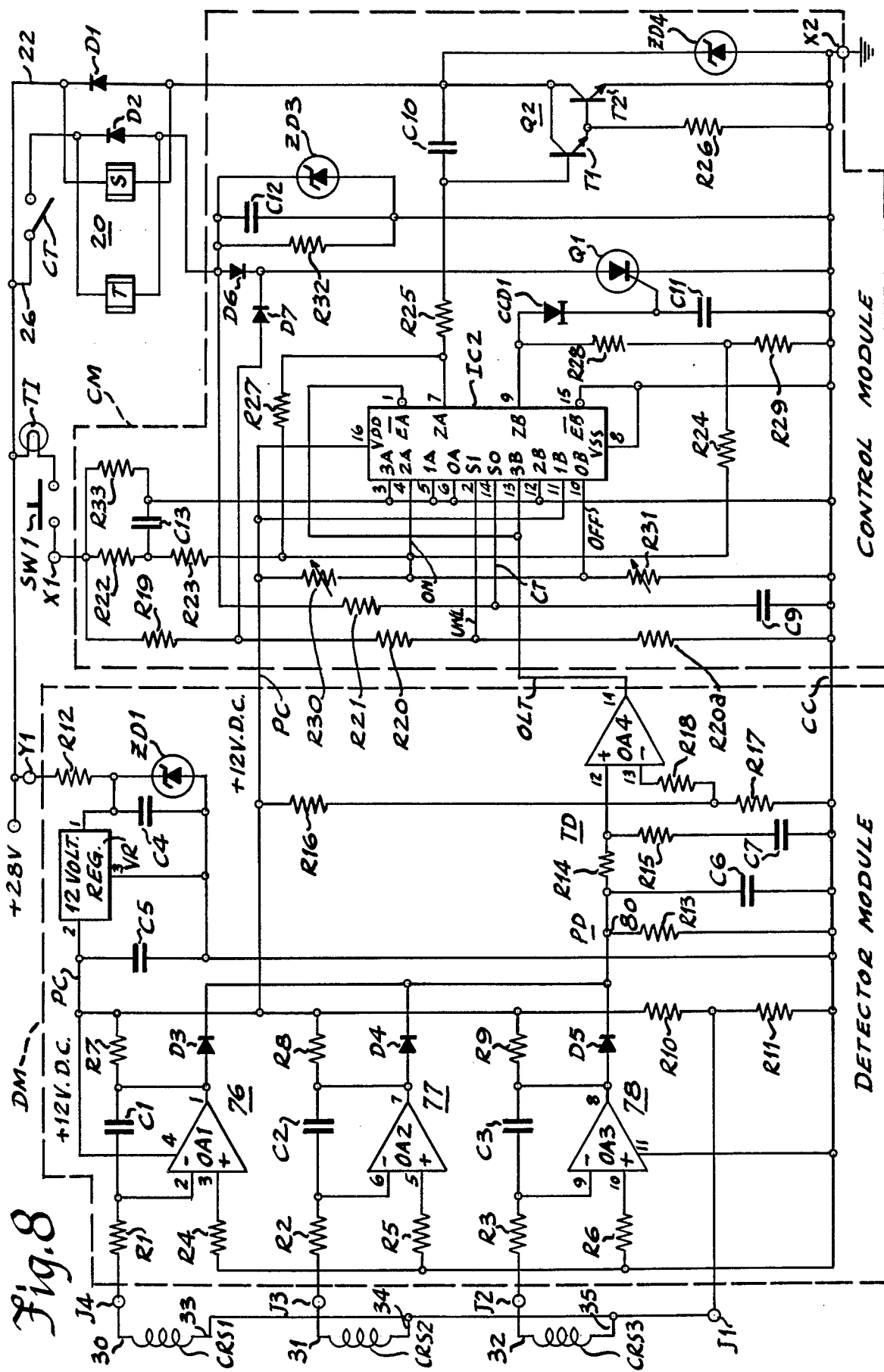
FIG. 8 is a schematic diagram of the solid state electronic circuit integrally included in the two electronics modules within the housing of the remote power controller of FIGS. 1-7.

The circuit diagrams of detector module DM and control module CM are shown in FIG. 8. As shown therein current rate sensing wound toroids CRS1, CRS2 and CRS3 are connected at one side thereof through conductors 30, 31 and 32 to terminals J4, J3 and J2, respectively, and at the other side thereof are connected through conductors 33, 34 and 35 to common terminal J1, these connections being also shown in FIGS. 1 and 4.

DETECTOR CIRCUIT

Overload signal input terminals J4, J3 and J2 are connected to means for converting the rate-of-change of current signals of the three phases of the power line to voltages indicative of and proportional to the current of the line conductors. This means comprises three self-biasing integrators 76, 77 and 78, one for each phase of the power line. These integrators are alike and each comprises an operational amplifier OA1, OA2 or OA3, an input resistor R1, R2 or R3 connecting its coil terminal J4, J3 or J2 to its inverting input 2, 6 or 9, and an integrating capacitor C1, C2 or C3 connected between its inverting input 2, 6 or 9 and its output 1, 7 or 8. Ground is connected through a balancing resistor R4, R5 or R6 to its non-inverting input 3, 5 or 10, and a loading resistor R7, R8 or R9 connects a 12 volt D.C. power conductor PC to its output 1, 7 or 8. A bias circuit is connected from D.C. power conductor PC through voltage dividing resistors R10 and R11 to common conductor CC. A small bias voltage such as 5 millivolts or the like is applied from the junction of resistors R10 and R11 through the rate sensing wound toroids and input resistors to the inverting inputs of amplifiers OA1, OA2 and OA3 while their non-inverting inputs are connected through reference voltage resistors R4, R5 and R6 to ground at common conductor CC. This bias insures that the outputs of the operational amplifiers are normally clamped at low voltage level or ground, in the event of drift or offset or the like that might occur within these operational amplifiers. These outputs are connected through OR-logic diodes D3, D4 and D5 to a peak detector circuit PD hereinafter described.

The four operational amplifiers OA1–4 used in the detector module constitute an array of four operational amplifiers on an integrated circuit (IC) chip. Therefore, although positive voltage is shown as being connected from conductor PC only to terminal 4 of amplifier OA1 and only terminal 11 of amplifier OA3 is shown as connected to ground at common conductor CC, it may be assumed that these D.C. power connections are made within the IC chip to all four operational amplifiers. This power is applied from terminal Y1 through a 12 volt regulator VR to positive conductor PC. For this purpose, terminal Y1 is connected through a resistor R12 and a voltage limiting zener diode ZD1 of 33 volts rating or the like to common conductor CC. A filter capacitor C4 is connected across zener diode ZD1 to smooth the D.C. voltage. The junction between resistor R12 and capacitor C4 is connected to input 1 of 12 volt regulator VR whose output 2 is connected to positive voltage conductor PC, and whose common terminal 3 is connected to common conductor CC. A stabilizing capacitor C5 is connected from output 2 of the regulator to common conductor CC. Regulator VR is preferably a positive voltage regulator such as a Fairchild μA78L12AHC linear integrated circuit 3-terminal positive voltage regulator, or the like.

Figure 9:
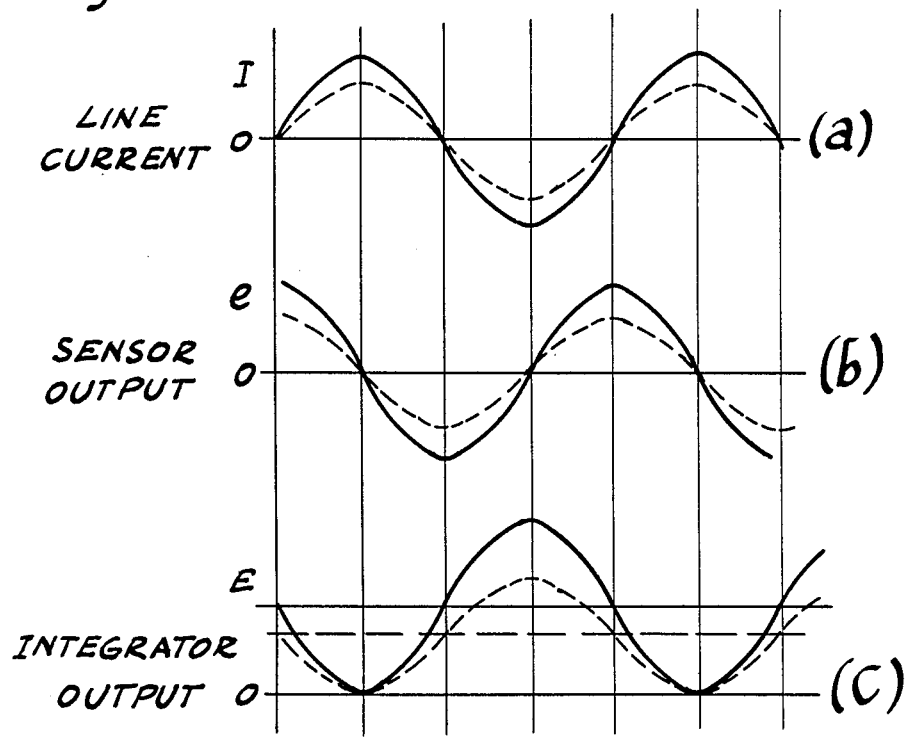
FIG. 9 is a graph showing operating characteristics of the detector module of FIG. 8.

The line currents on the three-phase power line are sine waves one of which is shown by curve (a) in FIG. 9, the solid and broken line sine wave therein depicting high and low amplitudes of line current. The rate sensing wound toroids pick up the rate of change in the line currents and provide input voltage signals proportional to such rate of change, one of which is shown by curve (b) in FIG. 9, the solid and broken line sine waves therein depicting high and low amplitudes of input voltages for the respective line current sine waves (a) in FIG. 9. Thus, the input voltage signals coming from the three current rate sensing wound toroids to the inverting inputs of the three operational amplifiers are three sine waves. Since the inverting input is biased 5 millivolts positive with respect to the noninverting input which is grounded, the output of each operational amplifier is clamped low. The voltage signals at the outputs of the three operational amplifiers are positive waves that are clamped integrals of the respective input signals. One of these output voltage signals is depicted by curve (c) in FIG. 9 which is an integral of curve (b) in FIG. 9, the solid and broken line sine waves therein depicting high and low amplitudes of output signal for the respective input voltage waves (b) in FIG. 9. Since the output voltage signals are integrals of the respective input signals, they are proportional to the peak to peak line current amplitudes. These output voltages of the integrators are applied to diodes D3, D4 and D5.

Figure 10:
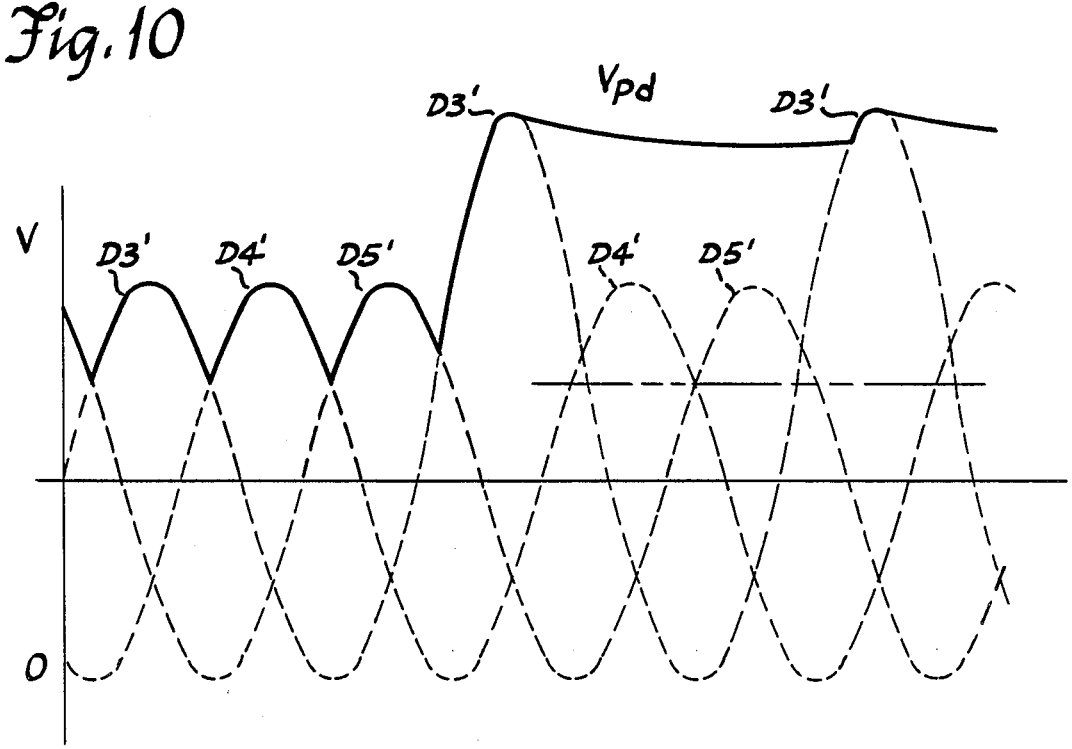
FIG. 10 is a graph showing an overload characteristic on one phase of the three-phase power line of FIG. 1.

These diodes D3, D4 and D5 constitute an OR-logic circuit that will pass that one of the output voltages of the three integrators that has the highest amplitude as shown in FIG. 10. These voltages in FIG. 10 are marked D3', D4' and D5' to relate them to diodes D3, D4 and D5, respectively. It will be seen in FIG. 10 by the heavy line contour that when wave D3' is higher than the other two, it will be passed by diode D3 to peak detector PD. Next, wave D4' is higher than the other two and will be passed by diode D4. Next, wave D5' is higher than the other two and will be passed. Next, an overload occurs on one line and wave D3' jumps much higher than the other two and will be passed by diode D3 to the peak detector.

This peak detector comprises a capacitor C6 and resistor R13 in parallel between input 80 and common conductor CC. The OR-logic diodes pass the highest amplitude voltage signal or peak of the three integrator outputs and capacitor C6 charges rapidly to such peak value which appears as a voltage at terminal 80.

As shown in FIG. 10, wave D3' jumps up high and quickly charges capacitor C6. This capacitor then discharges slowly through high resistance R13 as shown by the gradual down-slope of curve Vpd. Since capacitor C6 is now charged to a voltage higher than either phases D4' or D5', these have no effect thereon. When phase D3' comes again, capacitor C6 is again charged quickly to its full amplitude and starts a gradual discharge.

This voltage on capacitor C6 causes current flow through resistors R14 and R15 to charge capacitor C7 of an RC time delay circuit. The output of this time delay circuit is a voltage that is proportional to and simulates the temperature caused by the heating effect of the current. This time delayed signal is a calculated value that provides an analog simulation of a trip-free, compensated, thermal, circuit breaker. For this purpose, the charging time of capacitor C7 is proportional to the heating time. Capacitor C7 discharges through resistors R15, R14 and R13 which is proportional to the cooling time.

This temperature signal derived from trip time delay circuit TD is applied to non-inverting input 12 of operational amplifier OA4 which serves as a comparator. Trip time delay circuit TD comprises resistors R14 and R15 and a capacitor C7 connected in series from terminal 80 to common conductor CC with the junction between these resistors being connected to non-inverting input 12 of amplifier OA4.

A reference voltage is applied to the inverting input of amplifier OA4 so that the temperature signal voltage must rise to a predetermined value before an overload trip signal OLT is developed. For this purpose, positive 12 volts is applied from conductor PC through voltage divider resistors R16 and R17 to common conductor CC, with the junction between these resistors being connected through resistor R18 to inverting input 13 of amplifier OA4. As a result, the output of this amplifier is biased normally "low". When the temperature signal on non-inverting input 12 exceeds such reference voltage requiring tripping, amplifier output 14 provides an overload trip signal OLT which is a "high" to control module CM to cause tripping of the relay as hereinafter described.

CONTROL CIRCUIT

Control module CM is provided with a dual 4-input digital multiplexer IC2 such as a Fairchild CMOS Type F4539 or the like. As its name implies, this device has two multiplexer units in one chip.

Each of these multiplexer units operates in accordance with the following truth table:

| TRUTH TABLE | | | |
|---|---|---|---|
| INPUTS | | | OUTPUT |
| S0 | S1 | E̅ | Z |
| X | X | H | L |
| L | L | L | 0 |
| H | L | L | 1 |
| L | H | L | 2 |
| H | H | L | 3 |

H = High Level
L = Low Level
X = Don't Care

In other words, each multiplexer A and B has four data inputs 0, 1, 2 and 3, a data output Z and an active "low" enable input E̅, and the two multiplexers have a pair of select inputs S0 and S1 in common that function on a binary basis to route data from selected inputs of the two multiplexers to their respective outputs. In other words, as shown in the above truth table, when a "high" is applied to the enable input, the corresponding output goes "low" regardless of any signal on the select inputs. When the enable input is "low", the select inputs can control multiplexing, that is, routing of selected input data to the corresponding output. For this purpose, when both select inputs S0 and S1 are "low", (binary 00), the input 0 signals (data) are routed to the respective outputs. When select inputs S0 and S1 are "high" and "low", respectively, (binary 01) the input 1 signals are routed to the respective outputs. When select inputs S0 and S1 are "low" and "high", respectively, (binary 10) the input 2 signals are routed to the respective outputs. And when select inputs S0 and S1 are both "high", (binary 11) the input 3 signals are routed to the respective outputs.

As shown in FIG. 8, dual 4-input digital multiplexer IC2 is supplied with operating power from positive 12 volt conductor PC to its terminal 16 while its common terminal 8 is connected to ground at conductor CC.

Enable input $\overline{EB}$ of the B multiplexer unit is also connected to ground at conductor CC for reasons hereinafter apparent.

SET ACTION

The set action of this two-unit digital multiplexer is defined by the following Boolean equation:

SET = UNL·CT·OLT·ON

These four AND conditions must be present in order to obtain the set action of relay 20. First, the control signal UNL must be high, that is, switch SW1 closed and SCR Q1 off. This signal is applied from the positive 28 volt source through optional trip indicator TI, control switch SW1 which is of the maintained type, rather than momentary type, and resistors R19 and R20 to select input S1 of the multiplexer, this select input being connected through a threshold control resistor R20a to ground. This control signal current is limited by resistor R20 to a low value which is insufficient to illuminate trip indicator TI.

Secondly, cutthroat contact CT must be open, meaning that the relay contacts are open. As a result of the contact CT being open, A "low" is applied from common conductor CC through zener diode ZD3 and resistor R21 as a NOT CT signal to select input S0 of the multiplexer, capacitor C9 to ground suppressing noise.

Thirdly, an overload trip signal must not be coming from detector module DM, indicated by a NOT OLT signal. If such overload trip signal OLT, a "high", were present, it would be applied to enable input $\overline{EA}$ to keep output ZA "low" in accordance with the above truth table, thereby to prevent setting of the relay.

Fourthly, the set control input signal must be "on". This signal ON is applied as a "high" from the 28 volt supply through the optional trip indicator TI, switch SW1 and resistors R22 and R23 to input 2A, the latter being connected through resistors R24 and R29 to ground. This control signal path is also limited to a very low current, insufficient to illuminate the trip indicator.

The two select inputs S0 and S1 now having a "low" and a "high" signal, respectively, as aforesaid, data at inputs 2A and 2B of the two multiplexer units are now routed to the respective outputs ZA and ZB, according to the above truth table. Since input 2B is grounded, along with inputs 0A, 1A and 3A as shown in FIG. 8, output ZB is "low" and without effect. However, input 2A is receiving the aforesaid "high" ON signal so that output ZA goes "high" and is applied through resistor R25 to the base of transistor T1 of Darlington pair Q2 to turn it on. The "high" at output ZA is also fed back through resistor R27 to input 2A to maintain output ZA "high". Capacitor C10 between the base and collector of transistor T1 suppresses noise. The conduction of transistor T1 turns transistor T2 "on" to energize set coil S of the relay. For this purpose, current flows from the 28 volt source through conductor 22, set coil S and transistor T2 to ground. This set coil closes power contacts 20a, 20b and 20c in FIG. 1 as well as cutthroat contact CT in FIG. 8 and the relay magnetically latches these contacts closed. Zener diode ZD4 across transistor T2 protects the latter from high voltage peaks.

Since the relay is now latched closed, Darlington pair Q2 may be turned off. This occurs in response to the aforesaid closure of contact CT which removes the "low" and applies a "high" to select input S0 of the multiplexer. As a result, both select inputs S0 and S1 now have "highs" whereby data at inputs 3A and 3B are routed to the respective outputs ZA and ZB. Since input 3A is at ground, a "low", Darlington pair Q2 is turned "off" but the relay remains latched as aforesaid until the trip coil is energized. Since input 3B is connected to overload trip conductor OLT coming from the detector module, the system is now in readiness to trip in response to an overload signal.

TRIP ACTION

The trip action of this two-unit digital multiplexer is defined by the following Boolean equation:

TRIP = UNL·CT·OLT + UNL·CT·ON + UNL·CT

The first set of three AND conditions UNL·CT·OLT indicates an overload trip. This means that in order to trip the relay, the control signal UNL must be "on", cutthroat contact CT must be closed, and an overload trip signal must be received from the detector module. For this purpose, a "high" is applied from the 28 volt source through trip indicator TI, switch SW1 and resistors R19 and R20 as a signal UNL to select input S1. Also, a "high" is applied from the 28 volt source through cutthroat contact CT, trip coil T and resistor R21 to select input S0. With "highs" on both select inputs, data on multiplexer inputs 3A and 3B are routed to the respective outputs. Since input 3A is connected to ground, output ZA is "low" and ineffective. However, an overload trip signal OLT "high" at input 3B is routed to output ZB and applied through constant current diode CCD1 to the gate of silicon controlled rectifier Q1 to fire it into conduction. As a result, trip control T is energized by current flow from the 28 volt source through contact CT, coil T, diode D6 and SCR Q1 to ground. Capacitor C11 connected from the gate of SCR-Q1 to ground prevents inadvertent firing of the SCR. Trip coil T reopens power contacts 20a, 20b and 20c in FIG. 1 as well as contact CT. However, SCR Q1 is maintained conducting by anode current supplied from the 28 volt source through the optional trip indicator, switch SW1, resistor R19 and diode D7. The current in this path, now limited only by the relatively low resistance R19, is now sufficient to illuminate trip indicator lamp TI.

This continued conduction of silicon controlled rectifier Q1 will prevent the relay from re-setting in the event overload trip signal OLT terminates until switch SW1 is opened and reclosed. Thus, to re-set the relay, a deliberate manual operation is necessary. Opening switch SW1 removes the maintaining anode voltage from rectifier Q1 allowing it to stop conducting. Subsequent reclosure of this switch sets the relay as hereinbefore described.

The second set of three AND conditions $\overline{UNL}\cdot\overline{CT}$·ON indicates maintenance of the tripped condition so that the relay will not re-set automatically in consequence of a transient loss of the said maintaining anode current. For this purpose, it will be recalled from the above overload trip action that controlled rectifier Q1 was rendered conducting and was maintained conducting by supplying D.C. anode current from the 28 volt source through the trip indicator, switch SW1, resistor R19 and diode D7. This conduction of rectifier Q1 drops the voltage at the junction between resistors R19 and R20 near ground and, consequently signal UNL goes to $\overline{UNL}$, thus establishing the first of the three AND conditions above. As a result, select input S1 goes from "high" to "low". Since the cutthroat contact is open, the second AND condition $\overline{CT}$ is present. And switch SW1 being still maintained closed, the third AND condition ON is present.

Both select inputs S0 and S1 now having "lows", data on inputs 0A and 0B are routed to the respective outputs. Since input 0A is grounded, output ZA remains "low" so that the set coil is not energized. Signal ON which is a "high" on input 0B is routed to output ZB to maintain controlled rectifier Q1 fired into conduction, the relay tripped, and continuous current illuminates trip indicator TI.

The third set of two AND conditions $\overline{UNL}\cdot CT$ in the above trip equation indicates a manual trip. For this purpose, switch SW1 is opened to apply a "low" $\overline{UNL}$ signal to select input S1 while contact CT is closed applying a "high" CT signal to select input S0. This results in routing data from inputs 1A and 1B to the respective outputs. Since input 1A is grounded, output ZA is "low" and ineffective. However, a "high" is being applied from 12 volt conductor PC to input 1B and is routed to output ZB to fire controlled rectifier Q1 into conduction. As a result, the relay is tripped as hereinbefore described.

Following manual trip, the ON signal is "low" or $\overline{ON}$ so that the relay cannot be set until switch SW1 is reclosed.

It will be apparent that following the trip action, time delay circuit TD will provide thermal simulation to prevent re-setting the relay until the load has cooled. Following such trip action, capacitor C7 will not be reset to zero charge but instead will retain the charge that caused tripping and it will leak off slowly in accordance with the cooling time of the load or wires. This capacitor will discharge slowly by current flow through resistors R15, R14 and R13. Also, it will be apparent that capacitor C6 could at times charge far above what is necessary to cause tripping so that it will continue to charge capacitor C7 after tripping if a heavy overload occurred. Then, both capacitors will discharge to simulate the cooling of the load or wires. As long as the charge on capacitor C7 is above the tripping value, the relay cannot be set.

Resistor R30 connected from positive voltage conductor PC to turn-on signal input 2A and turn-off signal input 0B of the multiplexer and resistor R31 connected from these two inputs to ground are compensating resistors that are used to compensate for input threshold tolerances of the multiplexer. One or the other of these resistors is used depending upon whether the multiplexer threshold is high or low and are shown as variable resistors for convenience. If such threshold is high, resistor R30 is connected in or adjusted to the desired value. On the other hand, if such threshold is low, resistor R31 is connected in instead or adjusted to the desired value to insure that the multiplexer outputs switch at the desired input voltage levels.

Resistor R32 and capacitor C12 in parallel across silicon controlled rectifier Q1 and diode D6 prevent the SCR from being rendered conducting by transient voltages.

To re-set the relay, it is necessary to first open switch SW1 and then reclose it. Opening switch S1 removes the maintaining current from the anode of SCR Q1 to stop it from conducting. Opening switch SW1 also changes the logic state so that gate drive output ZB is simultaneously removed. Then reclosing switch SW1 causes energization of set coil S as hereinbefore described provided overload trip signal OLT is not present.

Figure 11:
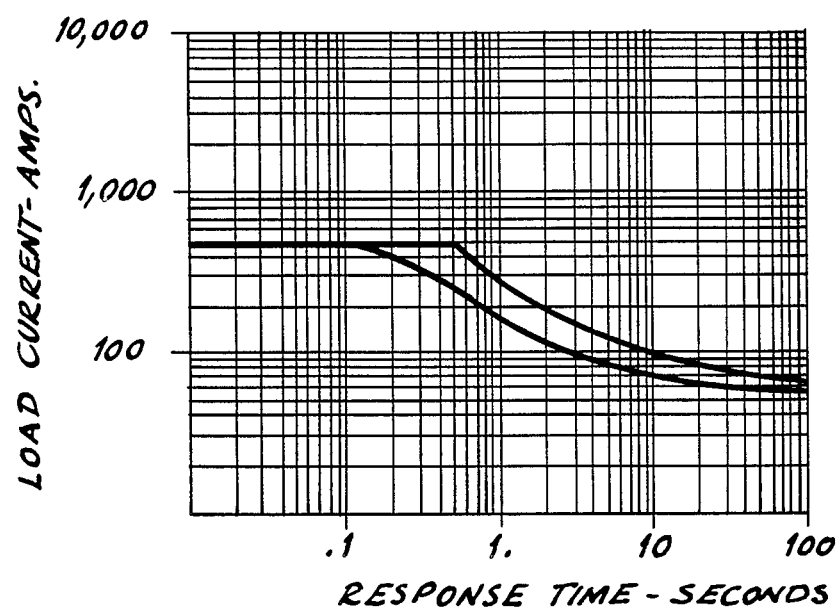
FIG. 11 is a graph showing the overload current response time operating characteristics of the remote power controller of FIGS. 1-8.

FIG. 11 shows operating characteristics of the invention in the form of a graph. In this graph, load current in amperes is plotted against response time in seconds. The system is arranged so that the relay will trip under the conditions within the outlines of this curve. It will be seen that if the current rises to 500 amps, the relay will trip in 0.1 to 0.5 second. At 100 amps, the system may take as long as 3 to 8 seconds to trip the relay.

Although a switch SW1 has been shown as a manual control device for the control module circuit in FIG. 8, it will be apparent that other means such as an automatic control switch or electronic means such as a transistor may be used in place thereof. Resistor R33 is connected from control device input terminal X1 to common conductor CC to provide a load for a transistor or the like that might be used as a control device. A capacitor C13 is connected from the junction between resistors R22 and R23 to common conductor CC to suppress electrical noise.

ALTERNATE CONTROL CIRCUIT

Figure 12:
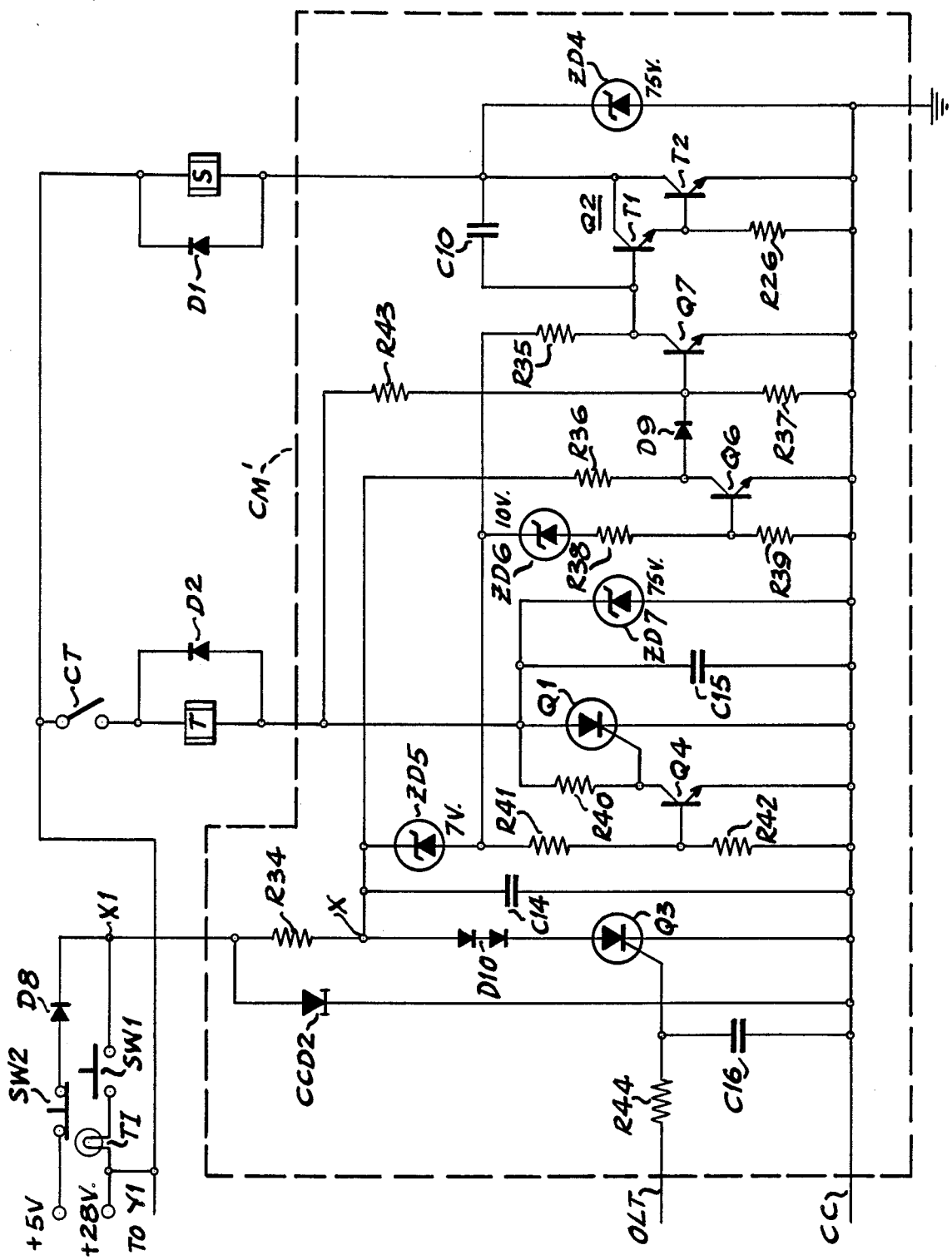
FIG. 12 is a schematic diagram of an alternative form of solid state electronic circuit that is usable instead of the circuit of FIG. 8 and which includes a reset lockout feature.

Although the FIG. 8 circuit advantageously exploits the capabilities of a standard integrated circuit for deriving the required control logic, this logic can also be derived with discrete components such as shown in the embodiment of FIG. 12 hereinafter described.

RESET LOCKOUT

It may be desirable to provide a reset lockout feature such that, following overload tripping, the relay cannot be set again merely by opening and then reclosing the control switch in the manner of control switch SW1 in FIG. 8. For this purpose, the alternate control module CM' in FIG. 12 is provided with a second switch SW2 in addition to control switch SW1. The reset lockout is applied from a low voltage source, such as 5 volts, through switch SW2 and diode D8 to control terminal X1.

This alternate control module circuit is shown within broken lines CM' in FIG. 12. The overload trip conductor OLT and common conductor CC of the detector module in FIG. 8 are connected to corresponding conductors at the left side of FIG. 12 while the positive 12 volt conductor PC of such detector module does not extend to FIG. 12. Also, the 28 volt power conductor in FIG. 12 extends to terminal Y1 in FIG. 8. In this manner, the alternate control module may replace the control module of FIG. 8.

In FIG. 12, under the conditions shown, transistor Q7 is normally "on" whereas silicon controlled rectifiers Q3 and Q1, transistors Q4 and Q6 and Darlington pair Q2 are normally "off". For this purpose, transistor Q7 base current is supplied from a positive 5 volt source through normally-closed lockout switch SW2, diode D8, resistor R34, resistor R36 and diode D9 to the base of transistor Q7. Switch SW2 is of the maintained type. This holds the voltage at the base of transistor T1 of Darlington pair Q2 near ground potential to keep pair Q2 turned "off". It will be noted that some elements in FIG. 12 are similar to those in FIG. 8 and for this reason have been given like reference characters. Although collector voltage is also applied to transistor Q6, it does not turn "on" because zener diode ZD5 blocks current flow to its base, this diode having a zener voltage rating above the 5 volt supply.

SET ACTION

In order to set the relay, switch SW1 is closed while switch SW2 may remain closed. Closure of control switch SW1 causes voltage to be applied from the positive 28 volt supply through switch SW1 and causes current flow through resistor R34, zener diodes ZD5 and ZD6 and resistor R38 to the base of transistor Q6. This turns transistor Q6 "on" so that current flow therethrough drops the voltage at its collector to near ground potential and this shunts current from the base of transistor Q7 causing it to turn off. As a result, current flows through resistor R35 into the base of transistor T1 of Darlington pair Q2 to turn the latter on and energize set coil S of the relay. Set coil S closes power contacts 20a, 20b and 20c in FIG. 1 and cutthroat contact CT in FIG. 12 and the relay is latched closed as hereinbefore described.

The relay now connects power from the three-phase source to the load in FIG. 1 and control module CM' in FIG. 12 is ready to trip to disconnect such power from the load if an overload signal is received on conductor OLT. For this purpose, anode voltage is applied from the 28 volt supply through trip indicator TI, switch SW1, resistor R34 and diodes D10 to silicon controlled rectifier (SCR) Q3 to prepare the latter to be fired into conduction by an overload trip signal. Capacitor C14 connected across diodes D10 and SCR Q3 suppresses electrical noise from firing the SCR Q3.

Although contact CT is now closed, SCR Q1 will not turn "on" because transistor Q4 is biased "on" and shunts the gate thereof to ground. For this purpose, current flows from the 28 volt supply through switch SW1, resistor R34, zener diode ZD5 and resistor R41 to the base of transistor Q4 and biases transistor Q4 "on". Current supplied from the 28 volt supply through contact CT, coil T and resistor R40 is shunted to ground by transistor Q4. This prevents the trip SCR from being fired "on" although anode voltage is supplied thereto from the 28 volt supply through contact CT and coil T. Due to the resistance R40 of the circuit being high, the current that flows through coil T is not large enough to energize this trip coil. Capacitor C15 suppresses electrical noise from SCR Q1 while zener diode ZD7 shunts transient voltage peaks therefrom.

Darlington pair Q2 now turns "off". Contact CT being closed, current flows from the 28 volt supply therethrough and through trip coil T and resistor R43 to the base of transistor Q7. Diode D9 blocks the current in resistor R43 from being diverted through transistor Q6. Due to the resistance in this circuit, this current is not large enough to energize trip coil T. However, the current is large enough to turn transistor Q7 "on". As a result, the collector of transistor Q7 drops near gound potential to turn Darlington pair Q2 "off". But the relay remains magnetically latched closed as hereinbefore described.

Transistors Q4, Q6 and Q7 are now "on" whereas SCR's Q3 and Q1 and Darlington pair Q2 are "off". The combination of voltage drops across zener diodes ZD5 and ZD6 assures that the proper turn-on threshold voltage has been provided at terminal X1 through the closure of switch SW1. This also limits current flow through R34 on trip indication TI to a low level, insufficient to illuminate the indicator.

MANUAL TRIP ACTION

In order to trip the relay, switch SW1 is opened while switch SW2 may remain closed. As a result, zener diodes ZD5 and ZD6 stop conducting since the 5 volt supply through switch SW2 is not high enough to keep them turned on. These zener diodes now interrupt the base currents of transistors Q4 and Q6 to turn them off. Transistor Q4 in turning off unshunts the gate of SCR Q1 so that current flow through contact CT and trip coil T turns the latter on. This causes trip coil T to be energized to open the power contacts of the relay. This also causes contact CT of the relay to open to interrupt the trip coil circuit. Since transistor Q6 was turned off, current from the 5 volt supply through switch SW2, diode D8, resistors R34 and R36 and diode D9 into the base of transistor Q7 holds the latter "on" thereby to re-establish the normal condition hereinbefore described.

OVERLOAD TRIP ACTION

For this function, it may be assumed that for the initial condition the relay has been set so that the relay contacts are latched closed, transistors Q4, Q6 and Q7 are "on" whereas SCR's Q1 and Q3 and Darlington pair Q2 are "off".

An overload trip signal coming over conductor OLT goes through resistor R44 to the gate of SCR Q3, capacitor C16 suppressing any electrical noise from this gate. This signal fires the SCR Q3 into conduction to drop the voltage level at junction X low enough to turn transistors Q4 and Q6 "off". This also increases current through R34 and the trip indicator to illuminate and indicate the overload tripped state.

Transistors Q4 and Q6 turn "off" because the voltage at junction X drops below the zener voltage of diode ZD5 thereby terminating base current to these transistors.

As a result, the gate of SCR Q1 is no longer shunted by transistor Q4 so that current flows through contact CT, coil T and resistor R40 into its gate to fire this SCR into conduction. This energizes trip coil T by current flow from the 28 volt supply through contact CT, coil T and SCR Q1 to common conductor CC. Trip coil T unlatches the relay and opens its power contacts 20a, 20b and 20c to disconnect power from the load in FIG. 1 and thus protect the system from the overload current. Trip coil T also opens cutthroat contact CT. Transistor Q7 turns off because its base current through resistor R43 is interrupted; however, Darlington pair Q2 cannot turn on because of the low voltage of junction X and zener diode ZD5.

This opening of the cutthroat contact stops SCR Q1 from conducting and deenergizes coil T. When the overload signal on conductor OLT terminates, SCR Q3 continues to conduct due to the anode current being applied thereto through switch SW1 and trip indicator TI.

Now all the transistors and SCR's are "off" except SCR Q3 which remains "on".

RESET LOCKOUT

Let it be assumed that an overload trip action has taken place as hereinbefore described, and that an attempt is made to re-set the relay in the normal manner by manipulation of switch SW1.

It will be recalled that following an overload trip action, all of the transistors and SCR Q1 are "off"-whereas SCR Q3 is conducting.

So long as the overload signal remains present, Q3 remains "on". Attempted re-set manipulation of switch SW1 will have no effect because Q3 holds the voltage at junction X low.

Following termination of the overload signal on conductor OLT, switch SW2 provides reset lockout. That is, upon opening of switch SW1 while switch SW2 remains closed, the current from the 5 volt supply remains above the value required to keep SCR Q3 conducting. In view of this, attempted re-setting of the relay by re-closing switch SW1 while reset lockout switch SW2 remains closed, will not raise the voltage at junction X high enough to permit setting of the relay.

The circuit is now locked out.

RESET ACTION

The reset state of the circuit is the condition from which it can be turned directly "on", that is, the condition from which the relay can be set by closing the control swtich SW1.

To attain this reset state, and to overcome the aforementioned reset lockout state, it is necessary to render SCR Q3 non-conducting.

It is only by opening control switch SW1 and reset lockout switch SW2 at the same time that SCR Q3 can be turned "off", thus allowing setting of the relay when switch SW1 is subsequently reclosed. For this purpose, opening both switches SW1 and SW2 allows SCR Q3 to stop conducting. And following this with reclosing of switch SW2 causes transistor Q7 to turn on, thus establishing the normal or initial condition hereinbefore described preparatory to setting the relay. Subsequent closure of switch SW1 will cause setting of the relay as hereinbefore described.

While the apparatus hereinbefore described is effectively adapted to fulfill the objects stated, it is to be understood that the invention is not intended to be confined to the particular preferred embodiment of minimum size, integral, overload current sensing, remote power controller disclosed, inasmuch as it is susceptible of various modifications without departing from the scope of the appended claims.

We claim:

1. In an electric power line system supplying a load, protective means comprising:
    a relay settable to connect electric power from the line to the load and being timely trippable to disconnect the electric power from the load to protect the system from thermal damage in the event of an overload condition comprising:
    operating means for said relay comprising detector means for providing an overload trip signal and relay control means responsive to said overload trip signal for tripping said overload relay;
    said detector means comprising thermal simulation means for providing a control signal having a magnitude and duration proportional to the thermal condition of the power line system comprising:
    sensor means for providing a first signal as a function of the rate of change of current in the power line sytem;
    integrator means responsive to said first signal for providing a second signal proportional to the magnitude of current in the power line system regardless of its waveshape;
    and signal modification means responsive to said second signal for providing said control signal and varying its magnitude and duration to simulate the thermal condition of the power line system;
    said detector means also comprising means responsive to said control signal exceeding a predetermined value for providing an overload trip signal;
    said relay control means comprising means responsive to said overload trip signal for tripping said relay;
    said relay comprising terminal studs whereby the same is connected to the power line system;
    said sensor means comprising at least one current rate of change sensing wound toroid having a coil wound on a closed magnetic core in fixed coupling around one of said studs for providing a voltage proportional to the rate of change of current in the corresponding portion of the power line system as said first signal;
    and said rate sensing wound toroid being small enough in diameter so that it will fit around said stud of a conventional size relay without requiring enlargement of the space thereat.

2. The protective means claimed in claim 1, wherein:
    said protective means also comprises a turn-on turn-off switch connected to said relay control means;
    and said relay control means also comprises means responsive to closure of said switch for closing said relay and means responsive to re-opening of said switch for tripping said relay open, and means responsive to opening and re-closing of said switch after said relay has been tripped by an overload condition for reclosing said relay.

3. The protective means claimed in claim 1, wherein:
    said protective means also comprises switch means connected to said relay control means;
    and said relay control means also comprises means responsive to selective operation of said switch means to set or trip said relay.

4. The protective means claimed in claim 3, wherein said relay control means also comprises:
    a trip circuit for said relay having cutthroat contacts therein;
    a dual plural-input digital multiplexer type logic circuit for controlling relay setting and tripping under the proper combinations of control, overload and system state signals comprising:
    means for initiating setting of said relay only if said relay control means is not in a tripping state (UNL); said cutthroat contacts are open ($\overline{CT}$), said overload trip signal is not present ($\overline{OLT}$), and said switch means is in its set operating position (ON).

5. The protection means claimed in claim 4, wherein:
    said digital multiplexer logic circuit comprises means for performing Boolean functions whereby tripping of said relay is controlled only under the proper combinations of circuit states comprising;
    means for initiating tripping of said relay only if said relay control means is not already in a tripping state (UNL), said cutthroat contacts are closed (CT), and said overload trip signal is on (OLT).

6. In an electric power line system supplying a load, protective means comprising:
a relay settable to connect electric power from the line to the load and being timely trippable to disconnect the electric power from the load to protect the system from thermal damage in the event of an overload condition comprising:
operating means for said relay comprising detector means for providing an overload trip signal and relay control means responsive to said overload trip signal for tripping said overload relay;
said detector means comprising thermal simulation means for providing a control signal having a magnitude and duration proportional to the thermal condition of the power line system comprising:
sensor means for providing a first signal as a function of the rate of change of current in the power line system;
integrator means responsive to said first signal for providing a second signal proportional to the magnitude of current in the power line system regardless of the shape of current wave;
and signal modification means responsive to said second signal for providing said control signal and varying its magnitude and duration to simulate the thermal condition of the power line system;
said detector means also comprising means responsive to said control signal exceeding a predetermined value for providing an overload trip signal;
and said relay control means comprising means responsive to said overload trip signal for tripping said relay;
said relay also comprising:
a housing for said relay;
and terminal studs extending through said housing for connecting said relay and its said operating means to external circuits including power line terminal studs having conventional relay stud spacing;
and said sensor means comprising current rate of change sensing wound toroids having a coil on a closed magnetic core and small enough in diameter to fit around said power line terminal studs in fixed coupling therewith without enlarging the conventional spacing therebetween.

7. The protective means claimed in claim 6, wherein: said detector means and said relay control means are a pair of modules situate alongside said relay within said housing connected to said relay and said studs therewithin to provide an integral unit.

8. In an electric power line system supplying a load, protective means comprising:
a remote power control relay having an operating coil and terminal means connected to said power line and contacts settable to connect electric power from the line to the load and being timely trippable to disconnect the electric power from the load to protect the system from thermal damage in the event of an overload condition comprising:
operating means for said relay comprising detector means for providing an overload trip signal and relay control means responsive to said overload trip signal for tripping said overload relay;
said detector means comprising thermal simulation means for providing a control signal having a magnitude and duration proportional to the thermal condition of the power line system comprising:
sensor means comprising a rate sensing toroid having a coil wound on a small diameter magnetic core supported by and coupled to said terminal means for providing a first signal as a function of the rate of change of current in the power line system;
integrator means responsive to said first signal for providing a second signal as a function of the magnitude of current in the power line system;
and signal modification means responsive to said second signal for providing said control signal and varying its magnitude and duration to simulate the thermal condition of the power line system;
said detector means also comprising means responsive to said control signal exceeding a predetermined value for providing an overload trip signal; p1 said relay control means comprising means responsive to said overload trip signal for tripping said relay;
said protective means also comprising a turn-on switch means and reset lockout switch means connected to said relay control means;
and said relay control means also comprising;
means responsive to operation of said turn-on switch means for closing said relay;
and means preventing reclosing of said relay in response to said operation of said turn-on switch following tripping thereof whereby such reset is locked out but being responsive to operation of both said reset lockout switch and said turn-on switch for reclosing said relay following tripping thereof.

9. In a three-phase electric power line system supplying a load, an integral protective power control device comprising:
a three-pole power switching device settable to connect electric power from said line to said load and being timely trippable to disconnect said electric power from said load to protect said system from thermal damage in the event of occurrence of overload current conditions therein comprising:
electronic control means for said power switching device comprising:
a first circuit for providing an overload trip signal that is an analog simulation of a trip-free, compensated, thermal element response as a function of the thermal condition of the system comprising:
sensor devices including small wound toroids having coils wound on closed magnetic cores fixed coupled to the three phases of said supply line for providing first voltage signals proportional to the rates of change of the currents in the respective conductors of the three-phase supply line;
voltage integrators responsive to said first voltage signals for providing outputs in the form of second voltage signals, respectively, proportional to the amplitudes of said currents in the respective conductors of said supply line regardless of the waveshape of said line currents;
a voltage peak detector for providing a third voltage signal as a function of the highest amplitude of said second voltage signals;
a thermal simulator network responsive to said third voltage signal for providing a control voltage signal as a function of the thermal condition of the three-phase system;
and comparator means responsive to said control voltage rising to or above a predetermined value for providing an overload trip signal;
and a second circuit responsive to said overload trip signal for tripping said three-pole power switching device to disconnect said electric power from said load.

10. The integral protective power control device claimed in claim 9, wherein:
said three-pole power switching device and said electronic control means are enclosed in a housing having a plurality of external terminal studs including three power terminal studs;
and said wound toroids of said sensor devices are situated around and rigidly coupled to the respective power terminal studs to inductively couple the same to the three phases of said supply line.

11. The integral protective power control device claimed in claim 10, wherein:
said first and second circuits are enclosed in plastic molding material to provide a pair of modules shaped to fit within said housing alongside said three-pole power switching device and connected thereto and to said terminal studs within said housing to provide a single unitary protective device.

12. In a three-phase electric power line system supplying a load, an integral protective power control device comprising:
a three-pole power switching device settable to connect electric power from said line to said load and being timely trippable to disconnect said electric power from said load to protect said system from thermal damage in the event of occurrence of overload current conditions therein comprising:
electronic control means for said power switching device comprising:
a first circuit for providing an overload trip signal that is an analog simulation of a trip-free, compensated, thermal element response as a function of the thermal condition of the system comprising:
sensor devices including small wound toroids coupled to the three phases of said supply line for providing first voltage signals proportional to the rates of change of the currents in the respective conductors of the three-phase supply line;
voltage integrators responsive to said first voltage signals for providing outputs in the form of second voltage signals, respectively, proportional to the amplitudes of said currents in the respective conductors of said supply line;
a voltage peak detector for providing a third voltage signal as a function of the highest amplitude of said second voltage signals;
a thermal simulator network responsive to said third voltage signal for providing a control voltage signal as a function of the thermal condition of the three-phase system;
and comparator means responsive to said control voltage signal rising to or above a predetermined value for providing an overload trip signal;
and a second circuit responsive to said overload trip signal for tripping said three-pole power switching device to disconnect said electric power from said load;
said three-pole power switching device and said electronic control means being enclosed in a housing having a plurality of external terminal studs including three power terminal studs;
said wound toroids of said sensor devices being situated around the respective power terminal studs to couple the same to the three phases of said supply line;
said second circuit comprising a digital multiplexer logic solid state element for performing Boolean functions whereby setting and tripping of said power switching device are controlled only under the proper combinations of circuit states;
said three-pole power switching device being an electromagnetic latching relay having a set coil and a trip coil, power contacts and a cutthroat contact in series connection with said trip coil;
and said second circuit also comprising means including said digital logic element for deenergizing said set coil following setting and latching of said relay thereby to eliminate the need for the cutthroat contacts in series with said set coil provided in prior art devices.

13. In an electric power line system supplying a load and having a current conductor between the source and load, a current sensor for providing an output voltage proportional to the current in said conductor comprising:
sensor means comprising a small toroid including a small coil wound on a small closed magnetic core and having high sensitivity for its small size;
means mounting said toroid in fixed concentric coupling to said current conductor to provide a voltage signal proportional to the instantaneous rate of change of current in said conductor;
and integrator means connected to said coil and responsive to said voltage signal for providing said output voltage accurately proportional to the current in said conductor regardless of the shape of the line current wave.

* * * * *